Feb. 22, 1938.  D. J. CAMPBELL  2,109,083
HOLLOW CRANKSHAFT
Filed Dec. 26, 1933  2 Sheets-Sheet 1
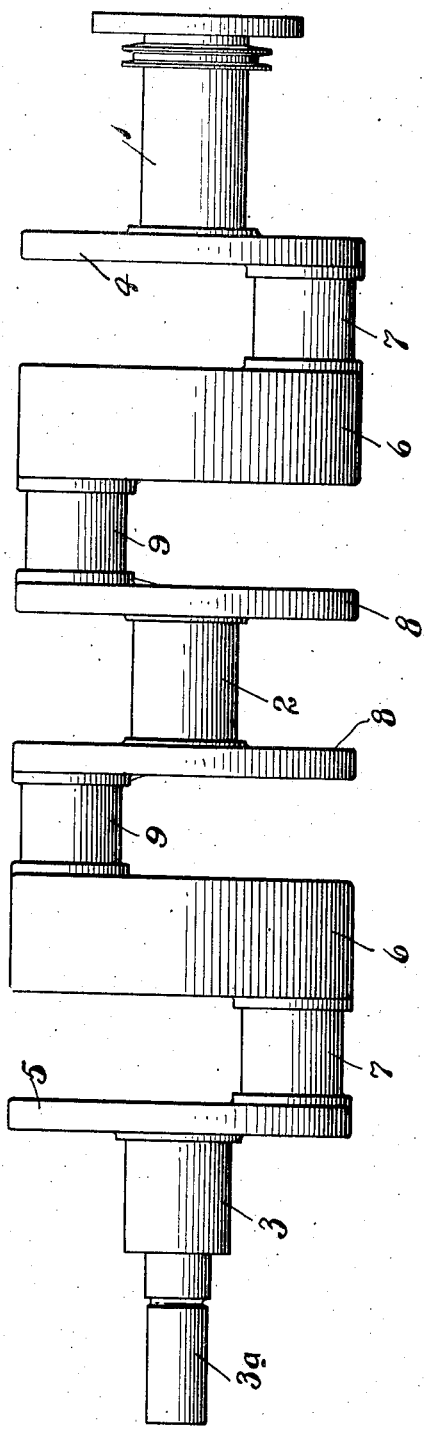
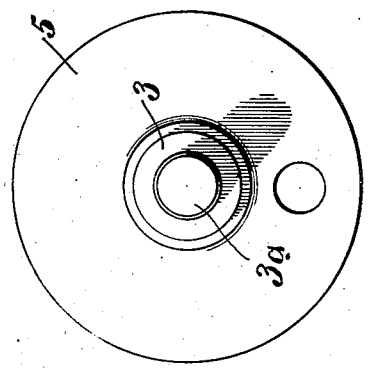
Inventor
Donald J. Campbell
By Liverance and
Van Antwerp
Attorneys Feb. 22, 1938.  D. J. CAMPBELL  2,109,083
HOLLOW CRANKSHAFT
Filed Dec. 26, 1933  2 Sheets-Sheet 2
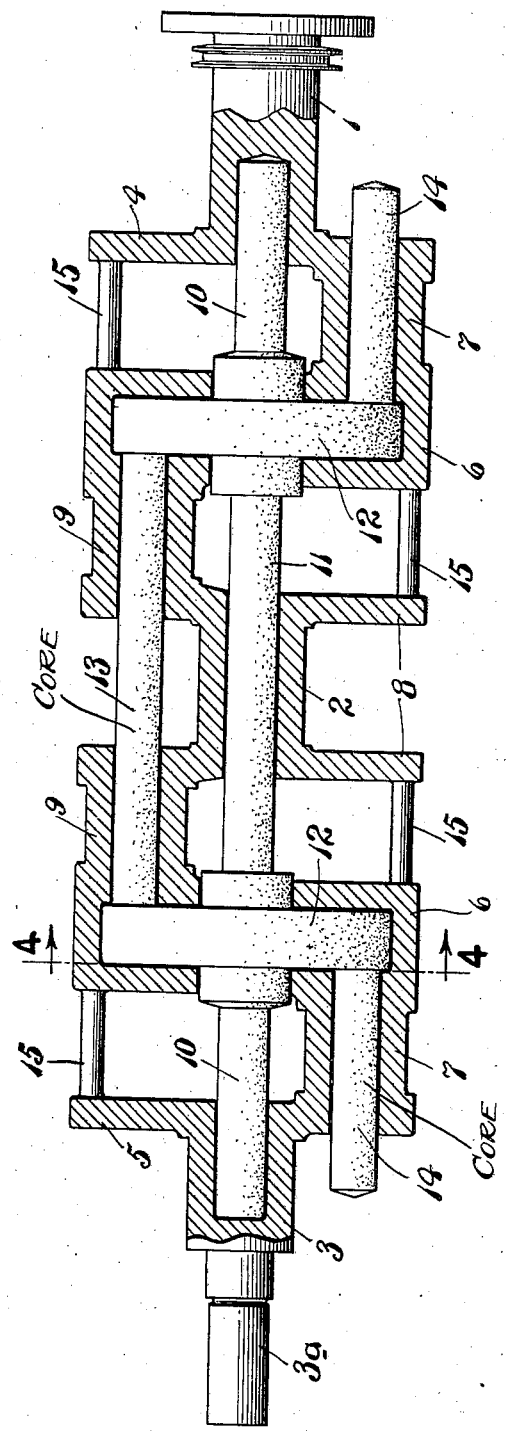
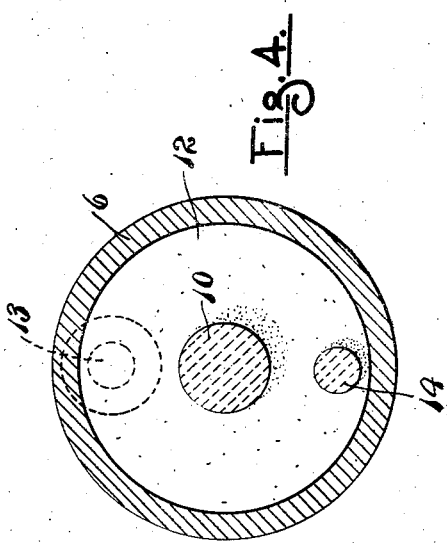
Inventor
Donald J. Campbell
By Liverance and
Van Antwerp
Attorneys Patented Feb. 22, 1938

2,109,083

UNITED STATES PATENT OFFICE 2,109,083

HOLLOW CRANKSHAFT

Donald J. Campbell, Spring Lake Township, Ottawa County, Mich., assignor to Campbell, Wyant & Cannon Foundry Company, Muskegon Heights, Mich., a corporation of Michigan Application December 26, 1933, Serial No. 703,943

7 Claims. (Cl. 22—200)

This invention relates to crankshafts and a method of making the same. The crankshaft is primarily for use in internal combustion engines. One of the objects of the invention is to produce a crankshaft which overcomes and obviates torsional displacement of the cranks when subjected to severe thrust of an engine piston and connecting rod, particularly in internal combustion engines, from the forces exerted by high compression. A further object of the invention is to produce a crankshaft of this character of light weight thus permitting rapid acceleration of the engine speed, ease of balancing and the application of vibration dampers internally of the shaft.

The objects of the invention stated, as well as many others not at this time enumerated, will be apparent as understanding of the invention is had from the following description, taken in connection with the accompanying drawings, in which, Fig. 1 is a longitudinal elevation of the shaft.

Fig. 2 is an end view of the left hand end of Fig. 1.

Fig. 3 is a longitudinal horizontal section illustrating the manner of casting the shaft, particularly the core used, and Fig. 4 is a transverse section substantially on the plane of line 4—4 of Fig. 3.

Like reference characters refer to like parts in the different figures of the drawings.

The crankshaft includes an end bearing section 1, an intermediate bearing section 2 and an opposite end bearing section 3, all in axial alinement, the part 3 having a reduced portion 3a as shown. At the upper ends of the sections 1 and 3 integral circular disks 4 and 5, respectively, are cast. A short distance from the disks 4 and 5 are relatively heavy cylindrical portions 6, connected at their outer sides respectively with the disks 4 and 5 by integral crankpin portions 7. At each end of the central section 2 are integrally cast circular disks 8, similar to the disks 4 and 5, which are likewise integrally connected with the part 6 by other crankpin portions 9, as illustrated diametrically opposite the crankpins 7. It is, however, to be understood that the invention is not limited to this specific location of the crank pins as described.

The shaft is made from an alloyed cast iron, such as set forth in the application of Campbell and Austin, filed Nov. 12, 1934, Serial No. 752,696, the molten metal being poured in a suitable mold. In accordance with my invention the mold is supplied with a core of special construction which is shown in Fig. 3. The core includes two end sections 10, and an intermediate section 11 in axial alinement. Between the ends of the section 11 and the adjacent ends of sections 10 are enlarged cylindrical core portions 12. Preferably, there is an enlargement of the core sections 10 and 11 where joined with the parts 12. A cylindrical core part 13 joins the two parts 12 previously described, as shown, and diametrically opposed thereto are core parts 14 extending at opposite sides from the parts 12.

It will be understood that the axially alined sections 10 and 11 lie lengthwise of the mold in a position such that when the shaft is cast the intermediate section 2 of the shaft will have a cored opening axially entirely through the same, and the end sections 1 and 3 will be partially axially cored from their inner ends outward. The heavy cylindrical parts 6 of the crankshaft will be hollow by reason of the core parts 12, and the crankpins 7 and 9 will be axially cored out by reason of the core parts 13 and 14. These cores make the walls adjacent thereto of substantially even thickness.

In casting, the mold is made so that in the finished casting there will be connecting bars 15 between the disks 4 and 5 and the part 6 and likewise between the disks 8 and the parts 5 and 6 positioned as shown in Fig. 3. This is for the purpose of equalizing shrinkage of the metal in cooling so that the crankshaft will not be unevenly shrunk and spring from proper shape. In finishing the shaft the bars 15 are removed.

A crankshaft as thus constructed is light in weight and is particularly strong. It will be observed that the cross section of all crankpin portions and bearing sections of the shaft are very nearly equal in transverse dimensions. This feature of construction lends itself very advantageously to a heat treatment of the shaft, all parts cooling evenly after the heat treatment, with the result that no overshrinking of any part occurs and there will be no draws or tendencies in the shaft to spring or warp out of shape or alinement in heat treatment when the cooling takes place. The construction further insures against uneven shrinking and undesired springing or warping out of shape initially when the shaft is cast and cooled.

The construction of crankshaft and the method for producing the same are of very practical useful character, insuring the greatest strength for the weight of metal used and perfect cast iron shafts of an even, homogeneous structure. The shaft is first cast in a mold and afterward heat treated, and in both operations the metal reaches a very high degree of temperature from which it has to cool down to normal atmospheric temperature. The structure and method used insures against detrimental results which might occur from uneven cooling with resultant uneven shrinking. The construction of shaft also is of advantage in the heat treatment as both the longitudinal and transverse dimensions of the shaft are equally affected and both the tensile and transverse strength are increased in substantially equal amounts.

I claim:

1. The method of producing a crankshaft which consists in casting the same in a mold, and casting bars connecting crank portions of the shaft opposite to crankpin portions of the shaft, causing uniformity in shrinkage on cooling.

2. A casting of the class described having bearing portions and crankpin portions, connecting portions between the crankpin portions and additional connecting portions between the crankpin portions and the bearing portions and integral bars extending between the crank connecting portions and the additional crank connecting portions for the purpose described.

3. A crankshaft formed of cast metal, said crankshaft having crankshaft bearings and connecting rod bearings, portions connecting the several bearings together to form a crankshaft, certain of said portions being of solid construction and certain of said portions being of hollow construction, said connecting rod bearings being hollow, the thickness of the solid portion and the thickness of the walls of the hollow portions and the thickness of the walls of the connecting rod bearings being substantially equal for the purpose described.

4. A crankshaft as set forth in claim 3 in which certain of the crankshaft bearings are hollow, the walls thereof likewise being of the same thickness as that of the other walls for the purpose described.

5. A crankshaft formed of cast metal, said crankshaft having crankshaft bearings and connecting rod bearings, portions connecting the several bearings together to form a crankshaft, certain of said portions being of solid construction and certain of said portions being of hollow construction, the thickness of the solid portions and the thickness of the walls of the hollow portions being substantially equal for the purpose described and bars integrally formed between portions of the shaft opposite the connecting rod bearings.

6. A crankshaft formed of cast metal, said crankshaft having crankshaft bearings and connecting rod bearings, portions connecting the several bearings together to form a crankshaft, certain of said portions being of solid construction and certain of said portions being of hollow construction, the thickness of the solid portions and the thickness of the walls of the hollow portions being substantially equal for the purpose described, all of the bearings and also those portions connecting the connecting rod bearings being hollow.

7. A crankshaft formed of cast metal, said crankshaft having crankshaft bearings at each end and one intermediate its ends, a plurality of connecting rod bearings positioned between each of the end crankshaft bearings and the intermediate crankshaft bearing, portions connecting each of the adjacent connecting rod bearings to the end crankshaft bearings, similar portions connecting each of the adjacent connecting rod bearings to the intermediate crankshaft bearing, additional portions extending between the other ends of the connecting rod bearings, said last mentioned portions being of hollow construction, said connecting rod bearings also being hollow, said crankshaft bearings also being hollow, the thickness of the solid portions connecting the several connecting rod bearings with the adjacent crankshaft bearings and the thickness of the walls of the several hollow portions being substantially equal for the purpose described.

DONALD J. CAMPBELL.